March 29, 1955 V. C. GARRISON 2,705,166
PIE PLATE HOLDER
Filed May 23, 1950 2 Sheets-Sheet 1
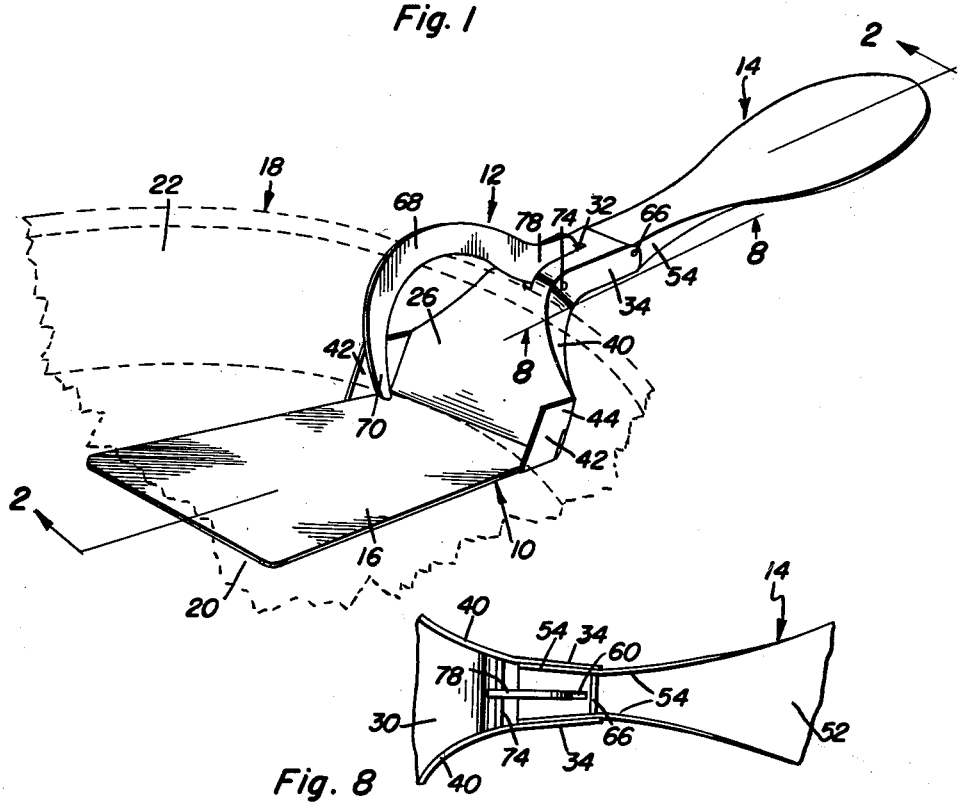
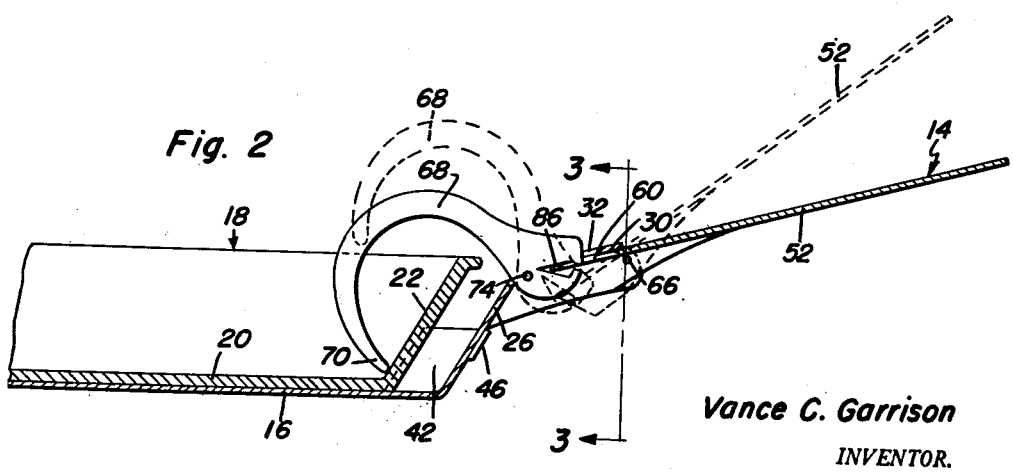
Vance C. Garrison
INVENTOR.

March 29, 1955     V. C. GARRISON     2,705,166
PIE PLATE HOLDER
Filed May 23, 1950     2 Sheets-Sheet 2
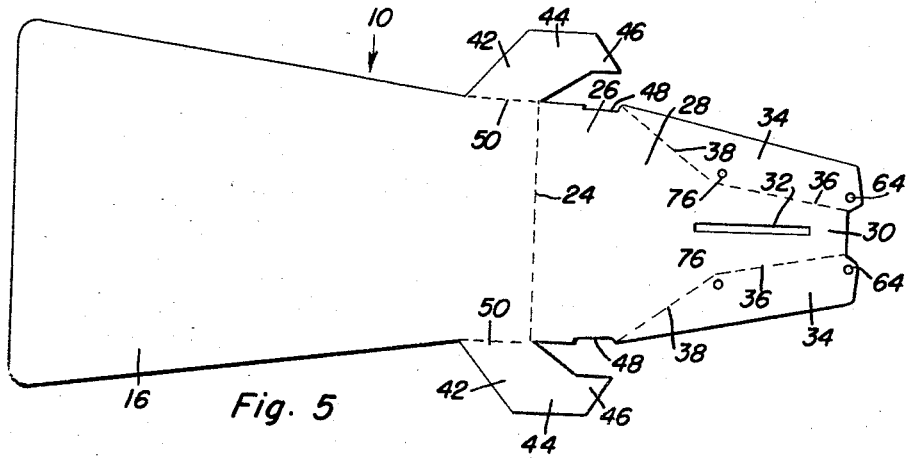
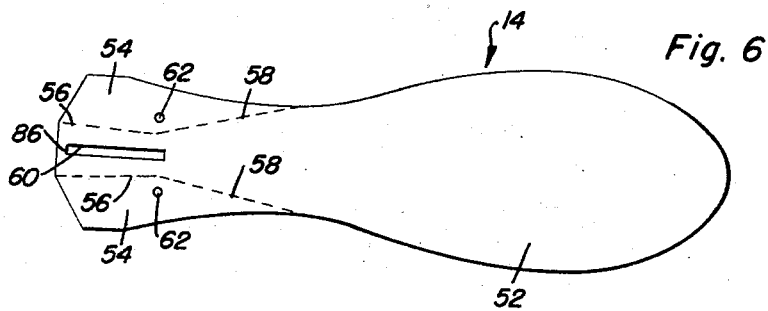
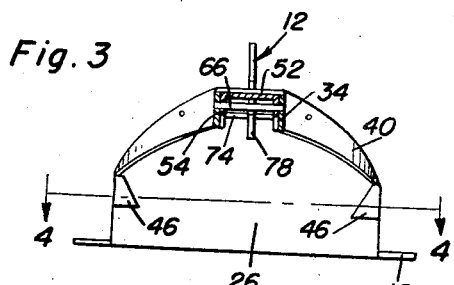
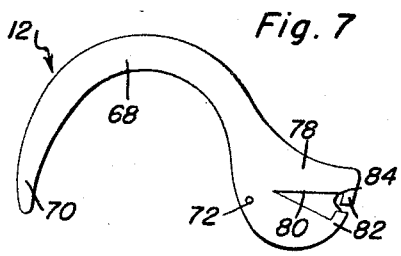
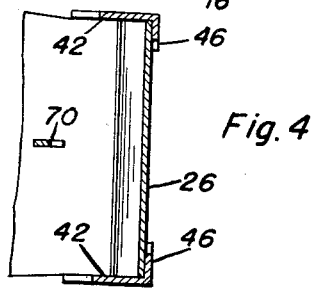
Vance C. Garrison
INVENTOR.

United States Patent Office 2,705,166
Patented Mar. 29, 1955

2,705,166

PIE PLATE HOLDER

Vance C. Garrison, Bemidji, Minn.

Application May 23, 1950, Serial No. 163,629

1 Claim. (Cl. 294—29)

This invention comprises novel and useful improvements in a pie plate holder and more specifically pertains to a lightweight and inexpensive tongs for securely and conveniently gripping hot articles such as pie pans or plates and the like and for handling the same, removing the pans from an oven or other inconvenient location, and without damaging the crust of a pie or other pastry which may be retained by the pan or plate.

The primary object of this invention is to provide an implement for readily grasping and manipulating a pie plate or pan and with a minimum damage to the contents of the same.

A further object of the invention is to provide a holder for pie plates and the like which is specifically adapted to be formed of inexpensive material such as sheet metal or the like; which shall have an efficient and improved gripping action on the pie plate; in which the device may be applied to or removed from a pie plate with a minimum damage to the contents of the same, and specifically without contacting or crushing the rim of the pie or other pastry contained in the plate.

Yet another object of the invention is to provide a holding implement having fixed and movable jaws and in which an improved actuation is obtained for the movable jaws; wherein an improved mounting of the movable jaw and of its actuating handle is realized; and wherein a very sturdy and dependable implement may be formed from sheet metal and the like.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a perspective view of one embodiment of a holder incorporating therein the principles of this invention, the same being illustrated in operative position for engaging a pie plate, a portion of the latter being indicated by dotted lines therein;

Figure 2 is a vertical longitudinal sectional view taken substantially upon the plane indicated by the section line 2—2 of Figure 1, different positions of the movable jaw and of the actuating handle for the same being indicated in full and dotted lines therein;

Figure 3 is a vertical transverse sectional detail view taken substantially upon the plane indicated by the section line 3—3 of Figure 2;

Figure 4 is a detail sectional view taken substantially upon the plane indicated by the section line 4—4 of Figure 3;

Figure 5 is a plan view of a sheet metal blank suitable for forming the fixed jaw of the implement, lines of folding various parts of the blank being indicated by dotted lines therein;

Figure 6 is a plan view of a blank from which the handle for operating the movable jaw may be formed, dotted lines indicating the positions thereon at which various portions of the blank are folded;

Figure 7 is a side elevational view of the movable jaw of the invention; and,

Figure 8 is a horizontal sectional view taken substantially upon the plane indicated by the section line 8—8 of Figure 1 and showing the manner in which the fixed and movable jaws are connected for pivotal guided movement.

Referring now more specifically to the accompanying drawings, wherein like numerals designate similar parts throughout the various views, attention is directed first to Figure 1 wherein it will be seen that the device includes a fixed jaw indicated generally by the numeral 10, a movable jaw indicated by the numeral 12 and a handle operatively connected to these parts and designated generally by the numeral 14.

Referring now more specifically to Figures 1 and 5, it is seen that the fixed jaw 10 may be expeditiously and economically constructed from suitable sheet metal or the like, the same being formed from a flat blank or strip of sheet metal having appropriately shaped portions to provide a flat body 16 which is adapted to underlie or be slid beneath a pie plate or pan 18, having a bottom 20 and an outwardly and upwardly inclined rim 22. As shown best in Figure 5, the flat bottom portion 16 is widest at its forward or outer end, and tapers inwardly towards its back or rear end, to a position indicated by the dotted line 24 at which the sheet is adapted to be folded upwardly and at an inclination with respect to the flat body.

This upwardly folding portion constitutes what is hereinafter referred to as an inclined portion 26 and which is disposed in a substantially parallel relation to the outer surface of the pie plate rim 22 as will be best seen from Figure 2.

At its upper end, and in a convenient location such as that indicated at 28, the inclined portion 26 is bent upwardly and backwardly and provides a shank portion 30 which is disposed above and at a slight inclination with respect to the flat body 16 as will be clearly apparent from Figure 2. Extending longitudinally and intermediate the ends and sides of the shank 30 is a medially disposed slot 32 for a purpose which will be later set forth. Upon the margins of the shank 30, are tabs 34 which are adapted to be bent downwardly upon the lines 36 and 38, to provide depending guide and retaining flanges as set forth hereinafter. That portion of the tab which is bent downwardly upon the lines 38 is curved to provide smoothly curving shoulders or side walls 40 which merge into the depending flanges 34.

Extending outwardly and backwardly and at an inclination to the sides of the flat body 16, and from that portion of the flat body which is adjacent to and forwardly of the line 24, are a pair of tabs 42, which are provided with rearwardly extending portions 44 and which terminate in end portions 46. Appropriately positioned upon the sides of the inclined portion 28, are slight recesses or notches 48. The arrangement is such that when the inclined portion 28 is bent upwardly about the line 24, the tabs 42 are bent upwardly about the lines 50 at which they join the flat body 16, and the rearwardly extending portions 44 are then received within the slots or recesses 48, and the tabs 46 are then bent backwardly and overlie the back of the inclined portion, as shown in Figure 2 to thus impart rigidity to the flat body 16 and the inclined portion 26, and also to provide by the front edges of the tabs 42, an inclined seat for receiving the exterior surface of the pie plate rim 22 as shown in Figure 2.

Referring now more specifically to Figures 1, 2 and 6, it will be seen that the handle 14 consists of a flat sheet of metal having its rear end provided with a laterally enlarged portion 52 appropriately shaped to constitute a handle, and having its forward end provided with marginal portions 54 adapted to fold downwardly upon the lines 56 and 58, the portions 54 thus constituting guide and retaining flanges as set forth hereinafter. The handle, intermediate the portions 54, is provided with a longitudinally extending slot 60 for a purpose which will be later set forth. The flanges 54 are further provided with apertures 62 which, upon folding of the flanges are adapted to be secured to similar apertures 64 formed in the flanges 34 of the shank, for the reception of a pivot pin 66 by means of which the handle is pivoted to the shank, with the handle flanges 54 being slidingly and guidingly received between the shank flanges 34 as will be apparent from Figure 8. As will now be apparent, from Figure 2, the engagement of the upper surface of the handle with the lower surface of the shank will limit pivotal movement of the handle in that direction, this position of the parts being indicated in full lines in Figure 2, while the handle may be pivoted upwardly with respect to the shank about the pivot pin 66, to assume the dotted line position shown in Figure 2 for a purpose which will be later apparent.

Referring next to Figures 1, 2 and 7, it will be seen that the movable jaw includes a cast metal or sheet metal hook portion 68 having a pointed nose 70, and having an aperture 72 through which is adapted to extend a pivot pin 74, by means of which the movable jaw is pivoted to the shank through corresponding apertures 76 formed in the depending flanges 34 of the shank. At its rear extremity, and rearwardly of the pivot pin 74, the movable jaw is provided with an arm portion 78, which has a V-shaped notch 80 extending inwardly from its rear end, this notch having at its rearward end a pair of slightly spaced arms 82 between which extends a restricted slot 84. The arrangement is such that the web portion of the handle 52, which forms the forward end of the slot 60, this web portion being shown at 86 in Figures 2 and 6, is received in the slot 80 and engaging the upper and lower walls of the same causes pivotal movement of the movable jaw about its pivot pin 74 in response to pivotal movement of the handle about its pivot pin 66. It wil be noted that the rear portion 78 of the movable jaw is thus vertically oscillatable through the slot 60 of the handle, while the web portion 86 of the latter extends horizontally through the slot 80 of the movable jaw and moves vertically therein.

It will now be apparent that in the device as described, when the handle is moved from the full line position to the dotted line position as shown in Figure 2, the hook portion of the movable jaw is moved from its full line position to its raised dotted line position so as to clear the rim 22 of the pie pan 18 and permit the flat body portion 16 of the movable jaw to be slid thereunder, as when the pie pan is in an oven or the like. By moving the handle downwardly from the dotted line position to the full line position shown in Figure 2, an arcuate movement will be imparted to the hook portion 68, causing the nose 70 thereof to move downwardly about an arc and penetrate the pie, pastry, or other material filling the pie pan 18 with a minimum disturbance of the same, until the nose 70 engages against the rim 22 and urges the pie pan 18 firmly against the seating lugs or tabs 42 and against the flat body 16, whereby the entire weight of the pie pan will increase the efficiency of the gripping action.

It will be specifically noted that during the use of this device, the crust of the pastry resting against the interior wall of the inclined rim 22 of the pie pan will not be disturbed, and the pie or other article will be pierced by only a small opening as the hook portion 68 is seated.

From the foregoing, the construction and operation of the device together with its many advantages will be readily apparent and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and improvements may be resorted to, falling within the scope of the appended claim.

Having thus described the invention, what is claimed as new is:

A pie plate holder comprising a fixed jaw, a movable jaw pivotally secured to said fixed jaw and a handle separately pivoted to said fixed jaw, said movable jaw having a hook portion for engagement with the inside rim of a pie pan only adjacent the bottom thereof, means connecting the handle and the movable jaw for operation of the latter by the former, said fixed jaw having a flat body for supporting the bottom of a pie pan thereon and a shank inclined and connected to said flat body by an inclined portion, tabs rising from said flat body and secured to said inclined portion, said tabs comprising seats for the outside of a pie pan rim, said shank having a slot, said movable jaw extending through said slot, a hook on said movable jaw for engaging a pie pan solely upon the lower portion of the pie pan rim and pressing the same against said tabs, said connecting means including a notched arm on said movable jaw, a finger on said handle engaged in the notch of said arm whereby pivotal movement of the handle will cause pivotal movement of the movable jaw.

References Cited in the file of this patent

UNITED STATES PATENTS

| 536,003 | Volkenrath | Mar. 19, 1895 |
| 862,416 | Skoog | Aug. 6, 1907 |
| 868,094 | Jerkins | Oct. 15, 1907 |
| 1,301,852 | Leaton | Apr. 29, 1919 |

FOREIGN PATENTS

| 30,630 | Sweden | Apr. 15, 1911 |
| 54,441 | Sweden | May 2, 1923 |